(No Model.)  2 Sheets—Sheet 1.

D. G. & H. A. REITZ.
FLOUR MATURER AND DOUGH RAISER.

No. 601,171. Patented Mar. 22, 1898.

Witnesses
E. N. Monroe
V. B. Hillyard

Inventors
Daniel G. Reitz
Henry A. Reitz
By their Attorneys,
C. A. Snow & Co.

(No Model.) 2 Sheets—Sheet 2.

D. G. & H. A. REITZ.
FLOUR MATURER AND DOUGH RAISER.

No. 601,171. Patented Mar. 22, 1898.

Witnesses
E. N. Monroe
V. B. Hillyard

Inventors
Daniel G. Reitz
Henry A. Reitz
By their Attorneys,
C. A. Snow & Co.

UNITED STATES PATENT OFFICE.

DANIEL G. REITZ, OF BERLIN, AND HENRY A. REITZ, OF SOMERSET, PENNSYLVANIA.

FLOUR-MATURER AND DOUGH-RAISER.

SPECIFICATION forming part of Letters Patent No. 601,171, dated March 22, 1898.

Application filed May 29, 1897. Serial No. 638,763. (No model.)

*To all whom it may concern:*

Be it known that we, DANIEL G. REITZ, residing at Berlin, and HENRY A. REITZ, residing at Somerset, in the county of Somerset and State of Pennsylvania, citizens of the United States, have invented a new and useful Flour-Maturer and Dough-Raiser, of which the following is a specification.

This invention provides means for facilitating bread-making under all climatic conditions, so that in excessive warm weather perfect ventilation may be had and in cold weather the room maintained at a comfortable temperature without affecting the leavening process, which is essential to successful bread-making. Light and nutritious bread can be had only when the flour is thoroughly ripened; and this invention provides for the maturing of flour which in the milling process and harvesting has not been thoroughly cured, such flour being maintained at a proper temperature for a given period to ripen and mature, whereby wholesome and sweet bread may be obtained.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
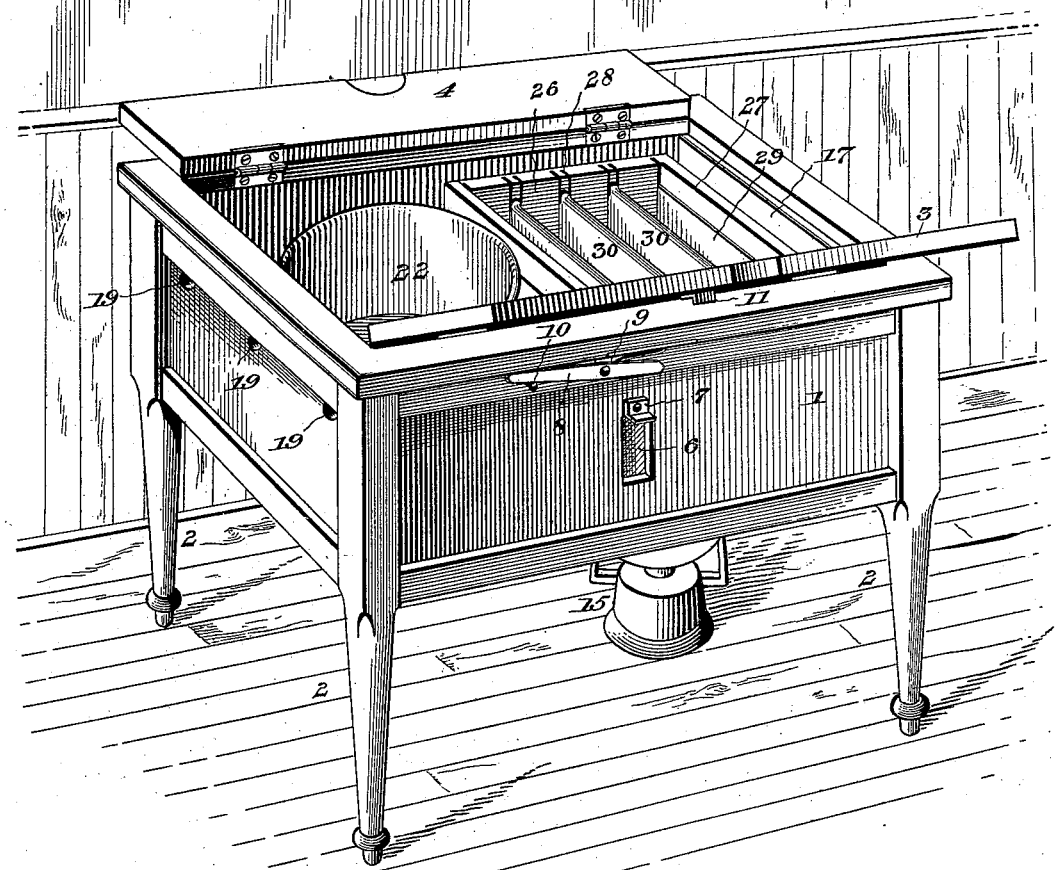
Figure 4:
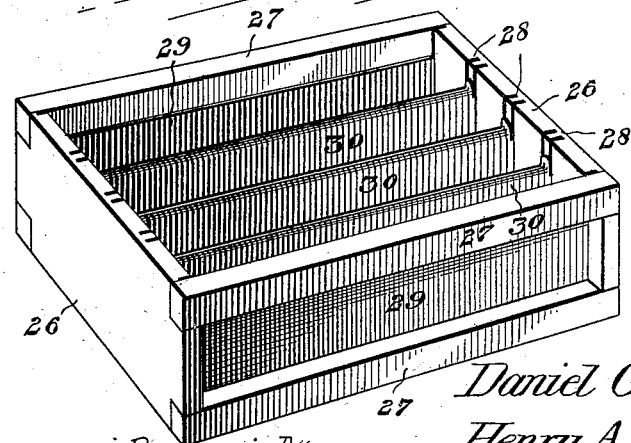
Figure 2:
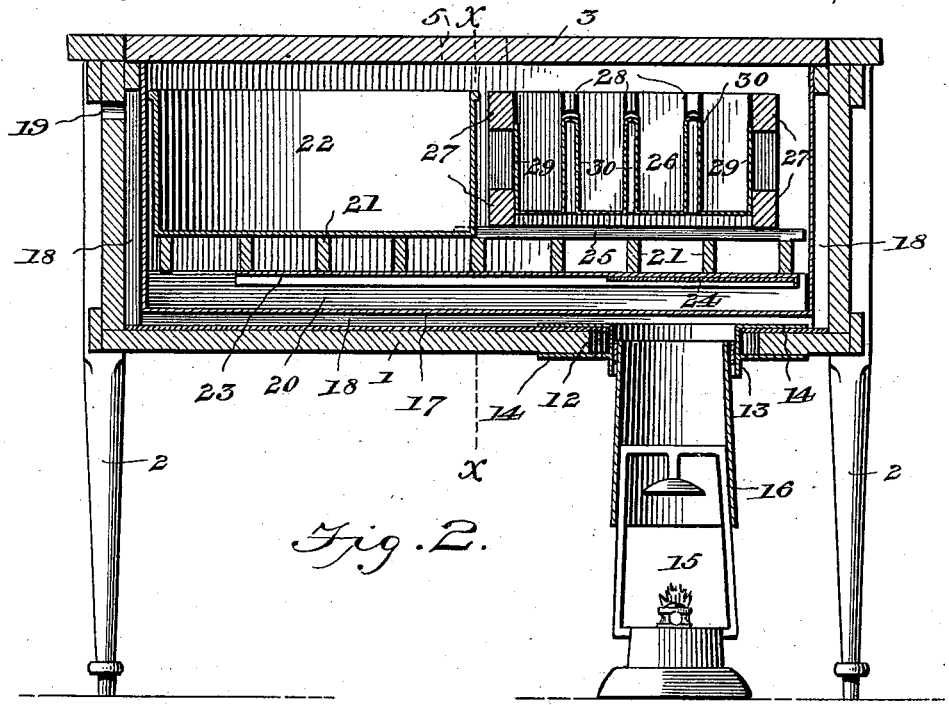
Figure 3:
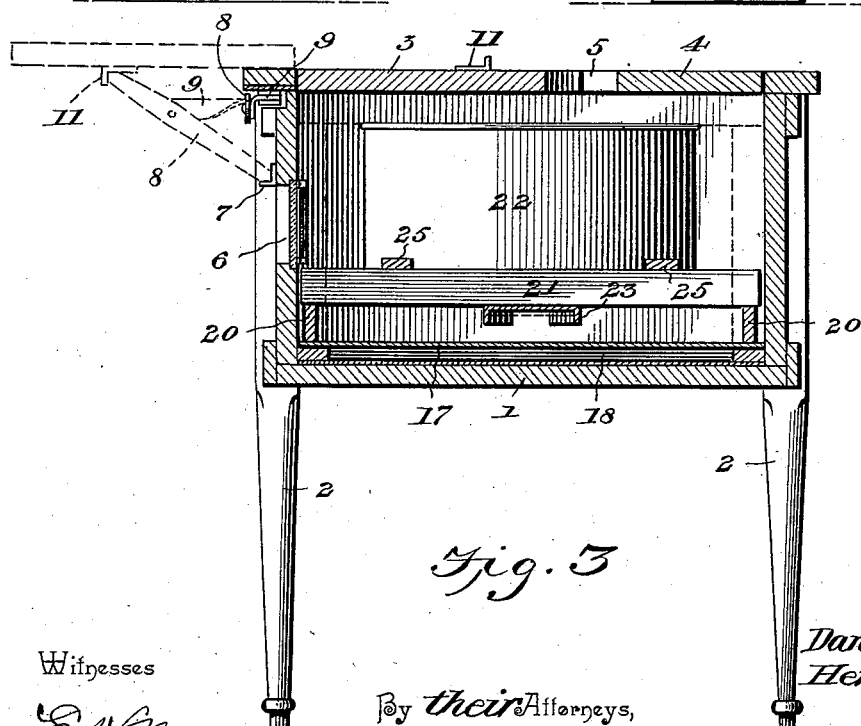

Figure 1 is a perspective view of an apparatus constructed in accordance with this invention for attaining the objects thereof, the parts of the cover being thrown open so as to disclose the flour-tray and dough-pan. Fig. 2 is a central longitudinal section thereof. Fig. 3 is a transverse section of the complete device on the line X X of Fig. 2, looking to the left, as indicated by the arrow, the dotted lines showing a portion of the cover in position and constituting a bread-board. Fig. 4 is a perspective view of the flour-tray.

Corresponding and like parts are referred to in the following description and indicated in the several views of the accompanying drawings by the same reference characters.

The apparatus comprises a box or receptacle 1, supported at a proper elevation by legs 2, applied to its corners, and is closed at its top side by means of a cover composed of wings or parts 3 and 4 of unequal width and having notches in their meeting edges, which unitedly form a vent-opening 5 when the cover is closed for the escape of gases and ventilating the device when in operation. An observation-opening 6 is provided in a side of the box or receptacle and is protected by glass or other transparent substance to admit of a thermometer being read to determine the temperature within the box without requiring the opening of the cover. An angle-iron 7 is secured to a side of the box or receptacle immediately above the observation-opening and protects the latter and affords a support for the lower end of a brace 8, fulcrumed to an arm 9, having pivotal connection at its inner end with the upper portion of the box, the parts being proportioned so as to admit of the brace 8 folding close against the side of the box, as indicated in Fig. 1 and by the full lines of Fig. 3, a pin 10 engaging with the longer end of the brace 8 and holding it in position. An angle-iron 11 is secured to the wing 3 and is engaged by the upper end of the brace 8, as clearly indicated by the dotted lines in Fig. 3, whereby the wing 3 is supported in a horizontal position and serves as a bread-board upon which the dough is kneaded, rolled, and otherwise manipulated.

An opening 12 is provided in the bottom of the box, near one end thereof, and is protected by a collar 13, which is secured to upper and lower plates 14, and to this collar is fitted a suitable heater for maintaining the interior of the box at the required temperature necessary for leavening the bread and maturing or ripening the flour. While any form of heater may be employed, a lamp 15 is shown as illustrating a heater of the simplest type, and a hood 16 is fitted to the upper portion thereof for collecting the hot air and directing the same through the thimble 13 into the box.

The bottom and ends of the box are protected by a sheet-metal plate 17, disposed so as to provide a space 18 between it and the corresponding parts of the box, and this space receives the hot air from the heater. In order to provide for a circulation of the hot air, a series of openings 19 are provided along the upper end of the end of the box remote from the heater. The provision of the sheet-metal lining 17 prevents any odor or gases from the heater entering the box and imparting any unpleasant flavor to the bread or flour and presents an extended heat-radiating surface and equalizes the distribution of the heat and insures an equalization of the temperature within the box at every point. This lining 17 will be provided only in high-grade machines and will be omitted in the cheaper grades, and in the latter the hot air from the heater will pass direct into the box or receptacle and out through the vent-opening 5 along with the gases resulting from the leavening process and the curing of the flour.

A rack is placed upon the bottom of the box and comprises longitudinal strips 20 and transverse strips 21, the latter being secured at their ends to the longitudinal strips 20 in any way found best adapted, according to the nature of the material employed in the formation of the rack. This rack extends the full length and breadth of the box and forms a support for the flour-tray and dough-pan 22, the latter being of any desired form commonly employed for this purpose. A deflector 23 extends longitudinally of the rack and is located midway of the sides thereof and is secured to the lower edges of the transverse strips 21 and is formed of a sheet-metal strip having its longitudinal edge portions bent downwardly to direct the hot air along the deflector to insure a proper distribution thereof, so as to prevent overheating of the flour located directly above the heater. The end of the deflector nearer the heater is bent downwardly, so as to cause the hot air to circulate toward the remote end of the deflector, and in order to provide for the equal distribution of the heat the deflector is of flaring form, the end over the heater being wider than the remote end, as clearly indicated in Fig. 3. A layer of asbestos or other non-heat-conducting material is applied to the lower side of the deflector, as indicated at 24, to prevent overheating of the substance located directly above, and this protector 24 is applied to that part of the deflector immediately above the heater. Strips 25 are secured to an end portion of the rack and support the flour-tray at a slightly-higher elevation than the dough-pan, thereby holding it at a greater distance above the plane of the heater.

The flour-tray consists of end pieces 26 and side connecting-strips 27, the end pieces 26 having pairs of parallel kerfs 28, formed vertically in their inner faces and in longitudinal alinement. The bottom and sides are closed by a sheet-metal strip 29, which is bent intermediate of its ends, so as to form vertical partitions 30, which are hollow and are open at their lower edges to admit of the hot air passing therein, the upper edges of the partitions being closed by the folds of the strip. The parallel walls of the hollow partitions 30 have their end portions let into the parallel kerfs 28 and are maintained in fixed relation thereby. These hollow partitions 30 afford an extended heat-radiating surface and insure a greater portion of the flour coming in contact with the heated surface, whereby the curing of the flour is effected in a comparatively short time and the maturing process rendered thorough.

The unseasoned and imperfectly-ripened flour is placed in the flour-tray and is matured by being subjected to the hot air of the apparatus, and when thoroughly ripened is used for preparing the rising or sponge and subsequently worked into dough and kneaded until the batch is in condition for baking, after which it is placed in the bake-pan and the latter introduced into the box, the dough-pan and flour-tray being removed until the dough rises sufficiently, after which the bread is removed from the device and baked in any of the usual ways.

Having thus described the invention, what is claimed as new is—

1. In a flour-maturer, the combination of a box, a heater applied to the bottom of the box near one end, a rack located within the box and supported upon the bottom thereof, and a deflector applied to the lower side of the rack and gradually decreasing in width from the end directly above the heater toward the end remote therefrom, substantially as and for the purpose set forth.

2. In a flour-maturer, the combination of a box or receptacle, a cover comprising a wing for closing the upper side of the box, an arm having pivotal connection with a side of the box, and a brace fulcrumed to the free end of the arm and adapted to be interposed between the wing and side of the box for supporting the wing in substantially a horizontal position, as and for the purpose set forth.

3. In a flour-maturer, a tray for containing the flour having a series of upright hollow partitions open at their lower edges, substantially as and for the purpose set forth.

4. In a flour-maturer, a tray for receiving the flour comprising a frame and a sheet-metal strip, the latter forming the bottom and folded at intervals in its length, forming hollow partitions, substantially as and for the purpose set forth.

5. In a flour-maturer, a tray for receiving the flour comprising a frame having parallel kerfs disposed in pairs in the inner faces of its end pieces, and a sheet-metal strip folded at intervals in its length, forming hollow partitions, and having the extremities of the walls forming the hollow partitions let into the said kerfs, substantially in the manner set forth for the purpose specified.

In testimony that we claim the foregoing as our own we have hereto affixed our signatures in the presence of two witnesses.

DANIEL G. REITZ.
    HENRY A. REITZ.

Witnesses:
 JACOB J. ZORN,
 ALEXANDER BRUBAKER.